United States Patent
Ratke et al.

(10) Patent No.: US 9,726,035 B2
(45) Date of Patent: Aug. 8, 2017

(54) HARD-STOP POSITION DETECTION METHODS AND SYSTEMS

(71) Applicant: HONEYWELL INTERNATIONAL INC., Morristown, NJ (US)

(72) Inventors: Todd Andrew Ratke, Corona, CA (US); Miguel Angel Perez Leal, Baja California (MX)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 301 days.

(21) Appl. No.: 14/687,650

(22) Filed: Apr. 15, 2015

(65) Prior Publication Data

US 2016/0305273 A1    Oct. 20, 2016

(51) Int. Cl.
   *F01D 17/16*   (2006.01)
   *F02D 41/00*   (2006.01)
   *F02D 41/24*   (2006.01)
   *F01D 21/00*   (2006.01)

(52) U.S. Cl.
   CPC ........... *F01D 17/16* (2013.01); *F01D 21/003* (2013.01); *F02D 41/0007* (2013.01); *F02D 41/2464* (2013.01); *F02D 2250/16* (2013.01); *F05D 2260/83* (2013.01)

(58) Field of Classification Search
   CPC .... F01D 17/16; F01D 21/003; F02D 2250/16; F05D 2250/90
   See application file for complete search history.

(56) References Cited

U.S. PATENT DOCUMENTS

| 6,665,604 | B2 * | 12/2003 | Arnold ................... F01D 17/14 60/600 |
| 7,065,966 | B2 * | 6/2006 | Yamada .................. F02B 37/24 250/231.13 |
| 8,523,511 | B2 | 9/2013 | Love et al. |
| 2009/0123272 | A1 | 5/2009 | Love et al. |
| 2012/0325189 | A1 | 12/2012 | Takezoe et al. |
| 2014/0338307 | A1 | 11/2014 | Kokotovic et al. |

FOREIGN PATENT DOCUMENTS

EP    1304462 A2    4/2003

OTHER PUBLICATIONS

Extended EP Search Report for Application No. 16163952.1-1603 dated Sep. 2, 2016.

* cited by examiner

*Primary Examiner* — Ninh H Nguyen
(74) *Attorney, Agent, or Firm* — Lorenz & Kopf, LLP

(57) ABSTRACT

Methods and systems are provided for determining a reference position associated with a variable geometry member. One exemplary method involves actuating the variable geometry member in a first direction with a first reference torque and obtaining a first position associated with the variable geometry member in response to the first reference torque. After actuating the variable geometry member with the first reference torque, the method continues by actuating the variable geometry member in the first direction with a second reference torque that is less than the first reference torque, obtaining a second position associated with the variable geometry member in response to the second reference torque, and identifying the second position as the hard-stop reference position when a difference between the first position and the second position is less than a fault threshold.

20 Claims, 7 Drawing Sheets

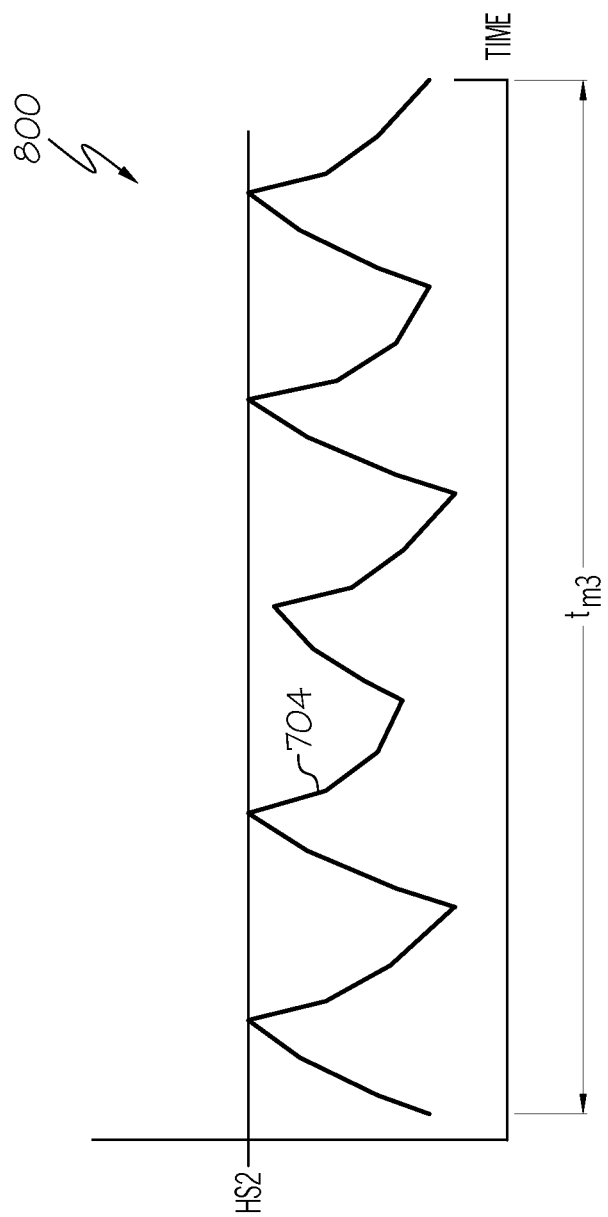

HARD-STOP POSITION DETECTION METHODS AND SYSTEMS

TECHNICAL FIELD

The subject matter described herein relates generally to turbines, and more particularly, relates to identifying hard-stop reference positions associated with one or more variable geometry members configured to regulate fluid flow, for example, in a variable geometry turbocharger.

BACKGROUND

For a turbocharger, it is often desirable to control the flow of exhaust gas into the turbine to improve the efficiency or operational range. In a variable nozzle turbine ("VNT"), variable geometry members (e.g., vanes) are employed to control the exhaust gas flow. Typically, multiple pivoting vanes annularly positioned around the turbine inlet and commonly controlled to alter the throat area of the passages between the vanes is a commonly used design.

A typical VNT includes an actuator capable of actuating the vanes through a range of flow positions that extends from a hard-stop closed position (a position where the vanes have closed off the exhaust flow to a point at which they are physically stopped) to a hard-stop open position (a position where the vanes have opened up the exhaust flow to a point at which they are physically stopped). A sensor device can be used to detect the actuation of the actuator, and thereby the position of the vanes.

During normal operation, turbocharger vanes are actuated through a range of positions, the most closed of which is a minimum-flow position that corresponds to a predetermined, fixed mass flow value. Due to tolerances and clearances in the variable geometry system (including the actuation system), there is variability of the vane position and the related actuation position for any given turbocharger when set for a given mass flow. Consequently, the actuation system of each turbocharger must be calibrated during assembly to ensure that it will direct the actuation of the vanes to the appropriate (minimum-flow) position to achieve the fixed mass flow value.

As the turbocharger ages, component wear occurs in the actuation system of the variable nozzle mechanism. As this wear builds up in actuation system components such as rods and gears that mechanically link the actuator to the VNT vanes, the wear creates a slowly increasing offset between the intended vane position and the actual vane position achieved under aerodynamic loading. Due to this drift, a previously identified minimum-flow actuator actuation position may no longer be accurate, and as a result, the mass flow may fail to achieve the desired mass flow value when the actuator is directed to actuate the vanes to that minimum-flow position. As a result, the turbocharger and related engine operate less efficiently, and emissions increase. These changes can manifest as a noticeable reduction in vehicle performance and changes in transient behavior.

BRIEF SUMMARY

Methods and systems are provided for determining a hard-stop reference position associated with a variable geometry member regulating fluid flow in a mechanical device, such as a turbine or compressor. One exemplary method involves actuating the variable geometry member in a first direction with a first reference torque and obtaining a first position associated with the variable geometry member in response to the first reference torque. After actuating the variable geometry member with the first reference torque, the method continues by actuating the variable geometry member in the first direction with a second reference torque that is less than the first reference torque, obtaining a second position associated with the variable geometry member in response to the second reference torque, and identifying the second position as the hard-stop reference position when a difference between the first position and the second position is less than a fault threshold.

In another embodiment, a system is provided that includes a turbine including a variable geometry member, an actuation arrangement, and a position sensing arrangement coupled to the actuation arrangement to measure an actuation position associated with the actuation arrangement. The actuation arrangement includes a motor and an actuation assembly coupled between the motor and the variable geometry member. The system also includes a control module coupled to the motor and the position sensing arrangement to operate the motor to actuate the variable geometry member in a first direction with a first reference torque, obtain a first actuation position from the position sensing arrangement in response to the first reference torque, operate the motor to actuate the variable geometry member in the first direction with a second reference torque that is less than the first reference torque after operating the motor with the first reference torque, obtain a second actuation position from the position sensing arrangement in response to the second reference torque, and identify the second actuation position as a hard-stop reference position when a difference between the first actuation position and the second actuation position is less than a fault threshold.

In another embodiment, a method of determining a hard-stop reference position associated with a vane assembly of a turbine is provided. The vane assembly includes a plurality of vanes configured to regulate fluid flow to the turbine. The method involves initializing the vane assembly away from the hard-stop reference position, and after initializing the vane assembly away from the hard-stop reference position, actuating the vane assembly in an actuation direction towards the hard-stop reference position with a first reference torque and obtaining a first actuation position associated with the vane assembly while the first reference torque is applied. After obtaining the first actuation position, the method continues by removing the first reference torque for a recovery period, and after the recovery period, actuating the vane assembly in the actuation direction with a second reference torque that is less than the first reference torque. The method obtains a second actuation position associated with the vane assembly while the second reference torque is applied, and when a difference between the first actuation position and the second actuation position is less than a fault threshold, the second actuation position is utilized as the hard-stop reference position for the vane assembly of the turbine.

BRIEF DESCRIPTION OF THE DRAWINGS

Embodiments of the subject matter will hereinafter be described in conjunction with the following drawing figures, wherein like numerals denote like elements, and:

FIG. 8 is a graph depicting the rotor shaft position during a monitoring period of FIG. 7 in accordance with an exemplary embodiment of the hard-stop detection process of FIG. 6.

DETAILED DESCRIPTION

Figure 1:
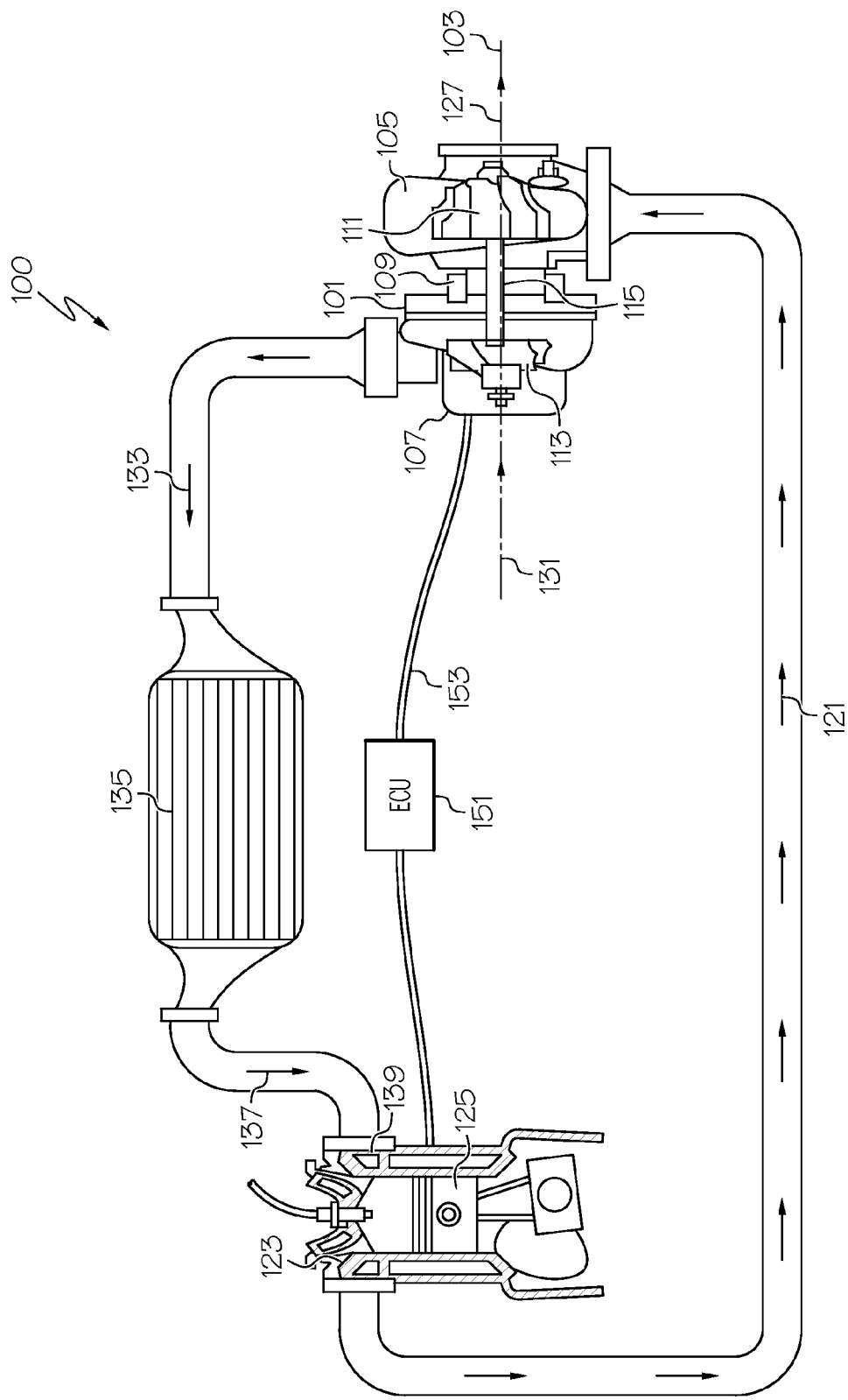
FIG. 1 depicts an engine system including a turbocharger in an exemplary embodiment.

Embodiments of the subject matter described herein relate to determining a reference position for one or more elements that are adjustable to regulate the fluid flow associated with a mechanical device, such as a turbine or a compressor. While the subject matter may be described herein primarily in the context of determining hard-stop reference positions associated with the vane assembly of a variable-nozzle turbine (VNT) or variable-geometry turbine (VGT), it should be appreciated that the subject matter is not limited to use with variable-nozzle turbines and may be implemented in an equivalent manner for actuating a wastegate or another adjustable member capable of regulating or varying the geometry of the fluid flow at the turbine inlet (or alternatively, the turbine outlet). Additionally, while the subject matter may be described herein in the context of turbines, it should be appreciated that the subject matter can be implemented in an equivalent manner for variable geometry compressors or any other mechanical device that utilizes one or more variable geometry members to regulate fluid flow.

As described in greater detail below in the context of FIGS. 5-8, in exemplary embodiments, to determine a hard-stop reference position for a vane assembly, the vane assembly is actuated towards an end of its range of motion corresponding to the hard-stop being determined For example, to determine a hard-stop closed reference position, the vane assembly is actuated towards its minimum flow position, and conversely, to determine a hard-stop open reference position, the vane assembly is actuated towards its maximum flow position. When the vane assembly is at or near the end of its range of motion corresponding to the hard-stop, the actuator associated with the vane assembly is operated to actuate the vane assembly towards the hard-stop with an initial reference torque, and an initial hard-stop reference position associated with the actuator in response to that applied torque is obtained. In exemplary embodiments, the applied torque is limited so that the hard-stop reference position can be determined without damaging the mechanical components and without the use of actuator hard stops that may restrict the vane assembly from being driven to its hard-stop position. For example, in one or more embodiments, the initial reference torque corresponds to a maximum torque that can safely be applied without damaging one or more of the actuator, the vane assembly, or the interconnecting hardware coupling the vane assembly to the actuator, such that the initial reference position corresponds to a point of maximum deflection, maximum compression (or minimal slack), and/or the like within the kinematic chain. In one or more exemplary embodiments, the initial reference torque is determined based on the relationship between the applied torque and a corresponding change in position and a desired level of accuracy for the hard-stop reference position to minimize the effects of torque ripple associated with applying greater amounts of torque. For example, if an applied torque of 60 Newton centimeters (N·cm) produces 1° of rotation of the vanes and it is desirable that the hard-stop reference position be determined to within 0.2° of rotation, the initial reference torque that is applied may be chosen to be a product of the torque-to-displacement ratio and the displacement tolerance (e.g. 12 N·cm).

Thereafter, the initial reference torque is removed for a recovery period of time that allows the actuator and/or the vane assembly to retract before operating the actuator to actuate the vane assembly towards the hard-stop with another reference torque that is less than the previously applied reference torque. In exemplary embodiments, the subsequent reference torque corresponds to a minimum torque that must be provided to overcome friction or other inertial forces in the kinematic chain to achieve displacement in the actuation direction. Variations in the position associated with the actuator are monitored while the subsequent reference torque is applied for a monitoring period, and when the variations during the monitoring period are less than a stability threshold, a second hard-stop position associated with the actuator is obtained and compared to the initial hard-stop reference position. When the difference between the second hard-stop reference position and the initial hard-stop reference position is less than a fault threshold, a validated hard-stop reference position for the actuator is set to the value of the second hard-stop reference position and subsequently utilized to determine how to actuate the vane assembly and achieve a desired flow rate. In this manner, the hard-stop reference position is accurately and reliably determined without damaging the mechanical components in a manner that compensates for deflection, compression, slack, variations in material characteristics, temperature, torque ripple, friction, electrical noise, and/or other noise factors.

FIG. 1 depicts an exemplary embodiment of a turbocharger system 100 that includes a turbocharger 101 configured to increase the efficiency of an engine, such as an internal combustion engine 125. The turbocharger housing includes a turbine housing 105, a compressor housing 107, and a bearing housing 109, which, in the illustrated embodiment, is centrally located and connects the turbine housing 105 to the compressor housing 107. The turbocharger 101 further includes a rotor configured to rotate within the turbocharger housing along an axis of rotor rotation 103 on thrust bearings and journal bearings (or alternatively, other bearings such as ball bearings). The rotor includes a turbine wheel 111 located substantially within the turbine housing 105, a compressor wheel 113 located substantially within the compressor housing 107, and a shaft 115 extending along the axis of rotor rotation, through the bearing housing 109, to connect the turbine wheel 111 to the compressor wheel 113.

The turbine housing 105 and turbine wheel 111 collectively form a turbine configured to circumferentially receive a high-pressure and high-temperature exhaust gas stream 121 from the exhaust manifold 123 of the internal combustion engine 125. In exemplary embodiments, the turbine is a variable geometry turbine or variable nozzle turbine, as described in greater detail below in the context of FIGS. 2-4.

The turbine wheel 111 (and thus the rotor) is driven in rotation around the axis of rotor rotation 103 by the high-pressure and high-temperature exhaust gas stream 121, which becomes a lower-pressure and lower-temperature exhaust gas stream 127 that may be axially released into an exhaust system (not shown). The compressor housing 107 and compressor wheel 113 form a compressor stage of the turbocharger 101. The compressor wheel 113 is driven in rotation by the exhaust-gas driven turbine wheel 111 via the shaft 115, and the compressor wheel 113 is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream 133 is characterized by an increased temperature, over that of the input air. In the illustrated embodiment, the pressurized air stream 133 is channeled through a convectively cooled charge air cooler 135 configured to dissipate heat from the pressurized air stream 133, increasing its density. The resulting cooled and pressurized output air stream 137 is channeled into an intake manifold 139 on the internal combustion engine 125, or alternatively, into a subsequent-stage, in-series compressor. The operation of the system is controlled by an ECU 151 (engine control unit) that connects to the remainder of the system via communication connections 153.

Figure 2:
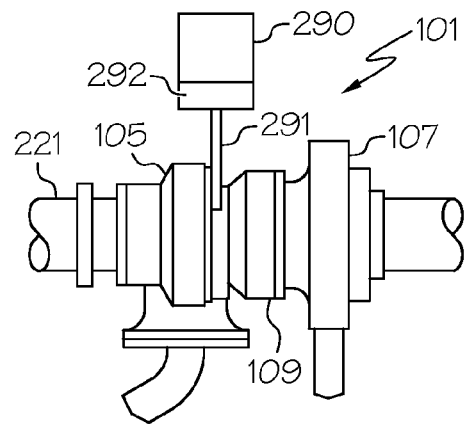
FIG. 2 is a plan view of the turbocharger in the engine system of FIG. 1 in an exemplary embodiment.
Figure 3:
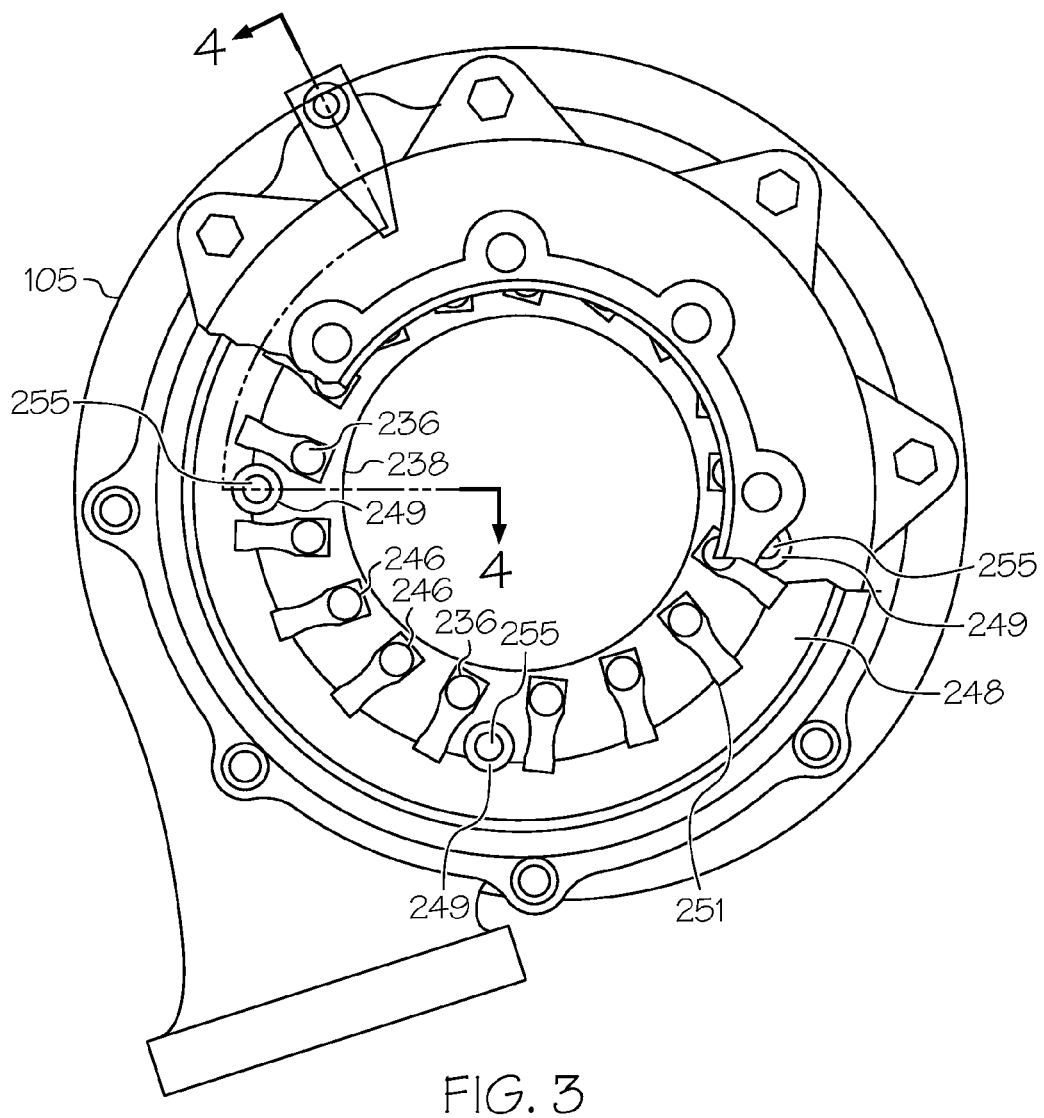
FIG. 3 is a cut-away side view of the turbine in the turbocharger depicted in FIG. 2.
Figure 4:
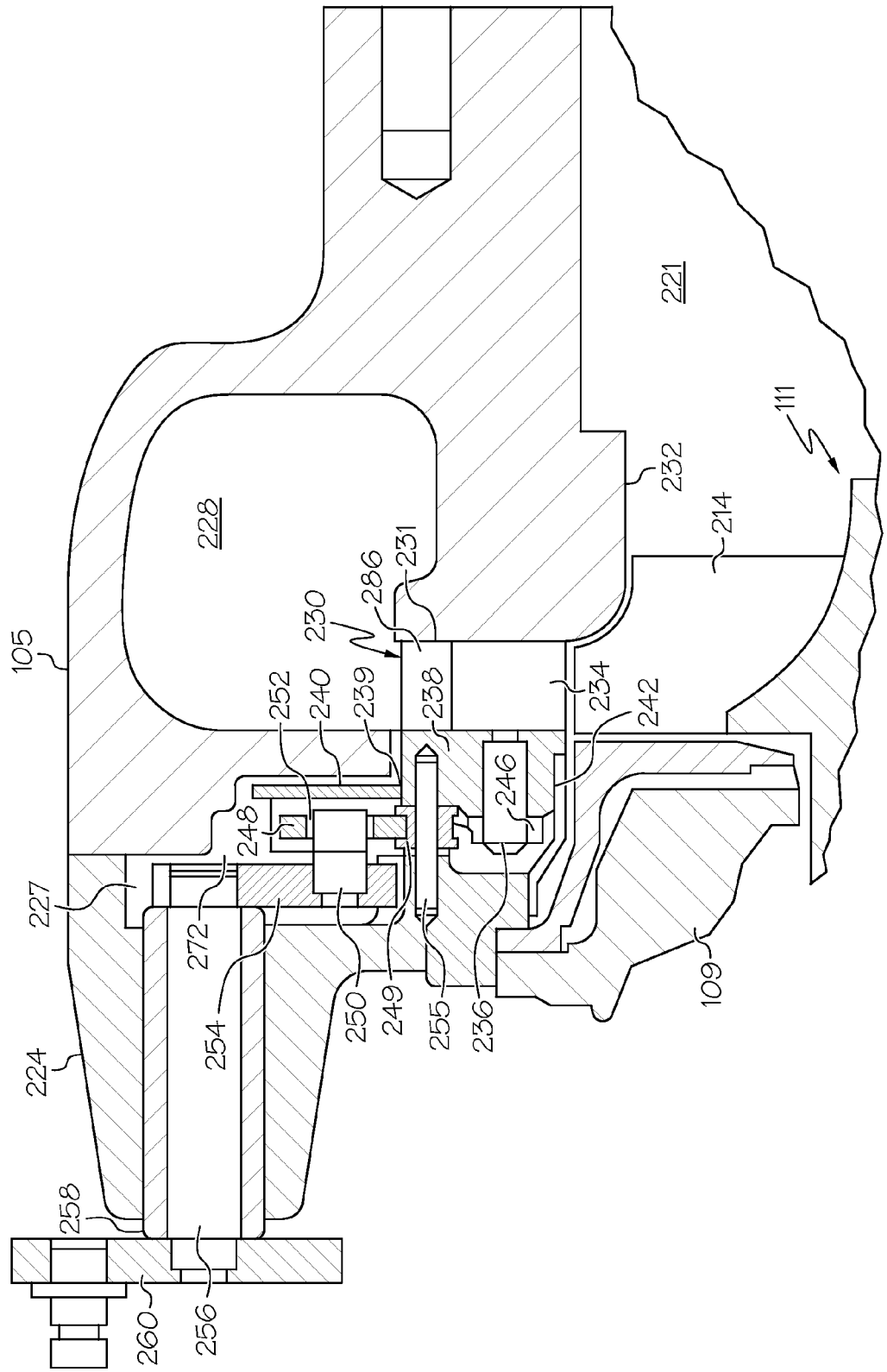
FIG. 4 is a cross-sectional view of the turbine along the line 4-4 in FIG. 3 in an exemplary embodiment.

Referring now to FIGS. 2-4, and with continued reference to FIG. 1, the turbine housing 105 forms a generally scroll-shaped volute 228 that accepts the exhaust gas 121 from the engine 125 and directs it onto blades 214 of the turbine wheel 111 through an annular passage 230. Thereafter, the exhaust gas flows axially through a turbine shroud 232 and exits the turbocharger 101 through an outlet 221 to the exhaust system (either into a suitable pollution-control device or the atmosphere) as the exhaust gas stream 127. A plurality of adjustable vanes 234 are disposed within the annular passageway 230 and the vanes 234 are actuatable to vary the geometry of the annular passage 230 to control the angle at which the exhaust gas 121 impacts the blades 214 of the turbine wheel 111. This in turn controls the amount of energy imparted to the compressor wheel 113, and ultimately the amount of air 137 supplied to the engine 125.

The variable geometry turbine nozzle of the illustrated embodiment is located between the center housing 109 and a turbine housing end of the turbocharger 101. A flange member 224 and the turbine housing 105 form a cavity 227 between the two in their assembled state which locates the hardware used in conjunction with the variable geometry turbine nozzle as will be described below. The exhaust gas present within volute 228 flows through the annular passageway 230 formed by an inner or side wall 231 of the turbine housing 105 and an annular nozzle ring 238.

The vanes 234 are located circumferentially around and within the annular passage 230 and the vanes 234 are mounted to the nozzle ring 238. The nozzle ring 238 has a plurality of radially spaced bores therethrough to accommodate a vane pin 236 associated with each vane 234. Attached to the other end of each vane pin is a vane arm 246, the shape of which can be best seen in FIG. 3. The vane arm 246 is attached to the vane pin 236 by welding, thereby rotatably attaching the vanes 234 to the nozzle ring 238 such that the nozzle ring 238 is between the vane 234 and vane arm 246. However, any suitable method of attachment can be used. A plurality of spacers 286 are also located within the annular passage 230 and located at the periphery of the vanes 234 and sized such that the spacers 286 have an axial length of 0.002 to 0.006 inches longer than the length of the vanes 234. The spacers 286 may be press fit within a bore formed in the nozzle ring 238, though any method of attaching the spacers 286 to the nozzle ring 238 or turbine side wall can be used.

A unison ring 248 is formed as an annular ring with a plurality of slots 251 on its inner radial surface. Each slot receives one of the vane arms 246. Radially spaced rollers 249 are located at the inner periphery of the unison ring 248. The rollers 249 are rotatably mounted on dowels 255 radially inwardly of the unison ring 248, and are secured between the flange member 224 and the nozzle ring 238, each having bores for acceptance of the dowel 255. The dowels 255 may have some axial clearance within these bores to allow the nozzle ring 238 slight axial movement. The rollers 249 include an annular groove therearound for acceptance of the inner periphery of the unison ring 248. The dowels 255 and rollers 249 could be provided at the outer periphery of the unison ring 248 if so desired.

The dowels 255 further perform the function of preventing the nozzle ring 238 from rotating. These rollers 249 are provided for ease of rotation of the unison ring 248 relative to the flange member 224, and together with the dowels 255 ensure the concentricity between the unison ring 248 and the nozzle ring 238, and the concentricity between the nozzle ring 238 and the flange member 224. The shape of the vane arms 246 must be such as to maintain basically a rolling action within the slots 251 to avoid binding within the unison ring 248 as it rotates to pivot the vanes 234.

The flange member 224 includes a recessed portion for acceptance of the actuation system as will be described below. Formed in the flange member 224 is a shoulder 272 that acts in cooperation with a Belleville spring 240. An inboard side (the side facing the center housing) of a radially outer edge of the Belleville spring 240 rests against the shoulder 272, and when assembled, an outboard side of a radially inner edge of the Belleville spring 240 acts against a shoulder portion 239 of the nozzle ring 238 such that it loads the nozzle ring 238 and the pins 286 against the side wall 231. The shoulder 272 is continuous about the flange 224 with the exception of a break to make room for the bell crank system described below.

A tube member 242 is of a generally cylindrical shape and has an annular bend formed therein. The tube member 242 is sized as that it is slidably engageable within the inner radial surface of the nozzle ring 238. The tube member 242 acts as a seal in the event any exhaust gas leaks behind the nozzle ring 238 and into the cavity 227 formed between the flange 224 and the turbine housing 105, thereby sealing the turbine housing 105 from the center housing 109.

The vanes 234 are adjustable between two hard-stop positions: a hard-stop closed position in which the vanes 234 are physically impeded from closing further, and a hard-stop open position in which the vanes 234 are physically impeded from opening further. Depending on the embodiment, the hard-stop closed position may be achieved by fully closing the vanes 234 such that each vane 234 impedes the next, or alternatively, by some other feature providing a physical stop for the vanes 234. The physical stop could be one or more features (e.g., protrusions or a ridge) that impede the vanes 234 from closing further, or alternatively, an actuation system characteristic limitation (e.g., a physical limitation in how far the unison ring 248 can move to drive the vanes 234).

In an exemplary embodiment, a bell crank system is used to rotate the unison ring 248 between its two hard-stop positions, which are the unison-ring positions that necessarily drive the vanes 234 to their corresponding hard-stop closed and open positions. More particularly, a pin 250 is rigidly connected to a first linkage member 254 at one end thereof. The pin 250 fits within a corresponding slot 252 within the unison ring 248 in order to transmit any movement in the bell crank to the unison ring 248. The first linkage member 254 is rigidly connected at a second end to an intermediate rod 256. The intermediate rod 256 projects through a bore in the flange member 224 to a point outside the turbocharger assembly. A bushing 258 is used in association with the intermediate rod 256. The intermediate rod 256 is rigidly connected at its other end to a second linkage member 260 that is connected to an actuator 290 by an actuator rod 291, as shown in FIG. 4. The actuator 290 may be a pneumatic actuator, which is well known in the art. Alternatively, the actuator 290 may be an actuator of another type, such as a rotary electric actuator ("REA"). One example of an REA can be found in U.S. Pat. No. 6,360,541. In this regard, it should be appreciated that the subject matter described herein is not limited to any particular type of actuator.

During operation, a linear movement of the actuator rod 291 drives the second linkage member 260 in rotation. This rotation drives the first linkage member 254 in rotation via the intermediate rod 256. The pin 250 translates movement of the first linkage member 254 into rotational movement of the unison ring 248. In turn, the vane arms 246 roll against the side wall of the slots 251 to pivot vanes 234 while the nozzle ring 238 remains stationary. Thus, in response to a linear movement of the actuator rod 291, there is a change in the geometry of the plurality of passageways formed between adjacent vanes 234. In the alternative case of an REA, the change in the geometry of the plurality of passageways is in response to a rotation of the actuator rod 291, as is known in the art.

Still referring to FIGS. 1-4, the variable geometry turbine includes variable geometry members (i.e., the vanes 234) located in an inlet (i.e., the annular passage 230) of the turbine, an actuator (the actuator 290) operative through a range of actuator (translational or rotational) positions to move the variable geometry members through a range of variable geometry member positions extending between a hard-stop closed position and a hard-stop open position. While these hard-stop positions can be reached by actuator actuation, in normal operation, the variable geometry members may not be driven all the way to the hard-stops to limit the effects of the hard-stop impact on the actuator or connecting linkages.

Instead, operational soft-stop positions (i.e., predetermined vane positions short of the extreme hard-stop positions) are used as the limits of movement in normal operation. These soft-stop positions define reference positions that correspond to desired minimum-flow and maximum-flow conditions. The accuracy of these positions with respect to achieving the intended flow rates is critical for the subsystem of the ECU 151 (or alternatively, an independent control system) that operates as a variable geometry turbine controller ("VGTC") to control the vanes 234 for efficient operation of the turbocharger 101.

In order to accurately control actuation of the vanes 234 between these soft stops, the illustrated embodiment of FIGS. 1-4 includes a sensor 292 configured for sensing information indicative of the position of the actuator rod 291 relative to the remainder of the actuator 290 at any given time. For example, the sensor 292 may sense the relative displacement of the actuator rod 291, which directly corresponds to the displacement of the vanes 234. For a pneumatic actuator this would typically be a longitudinal displacement, but for an REA it would typically be a rotational displacement. The VGTC is programmed with a transfer function such that the VGTC can calculate the position of the vanes 234 from the sensed actuator position information.

In practice, the turbocharger 101 may be calibrated during assembly to ensure that the same minimum flow rate can be achieved at the minimum-flow soft-stop in light of the inherent variability of the vane position due to tolerances and clearances. The calibration is based on the relationship between the actuation position and the vane position during operation of the turbocharger 101. More particularly, the calibration establishes a vane position that achieves the desired minimum-flow soft-stop flow rate, along with a related actuation position necessary to achieve the desired minimum-flow soft-stop vane position during operation. However, as the turbocharger 101 ages, component wear may introduce looseness, slack, and the like between the actuator 290 and the vanes 234, which, in turn, allows the vanes 234 to achieve a greater range of motion for a given actuator actuation position. Under aerodynamic loading, this looseness allows the vanes 234 to blow to a position different from the position they would hold without the looseness. As a result, the looseness changes the relationship (and thereby the correct transfer function) between the sensed actuator actuation position and the vane position during operation (i.e., under aerodynamic loading). Accordingly, the wear (i.e., the looseness) creates an offset between the actuation position for the aerodynamically loaded, loosened vanes 234 to be at their desired minimum-flow soft-stop vane position, and the actuation position for the aerodynamically loaded, original-condition vanes 234 (i.e., the vanes before the actuation system became loosened) to be at their desired minimum-flow soft-stop vane position. Likewise, the wear creates a similar offset between the actuation position for the loosened, hard-stop closed position, and the actuation position for the original-condition hard-stop closed position. Additionally, the looseness increases the range of actuation positions over which the actuator 290 must travel to necessarily force the vanes 234 to move between their hard-stop closed and open positions (despite any looseness).

Figure 5:
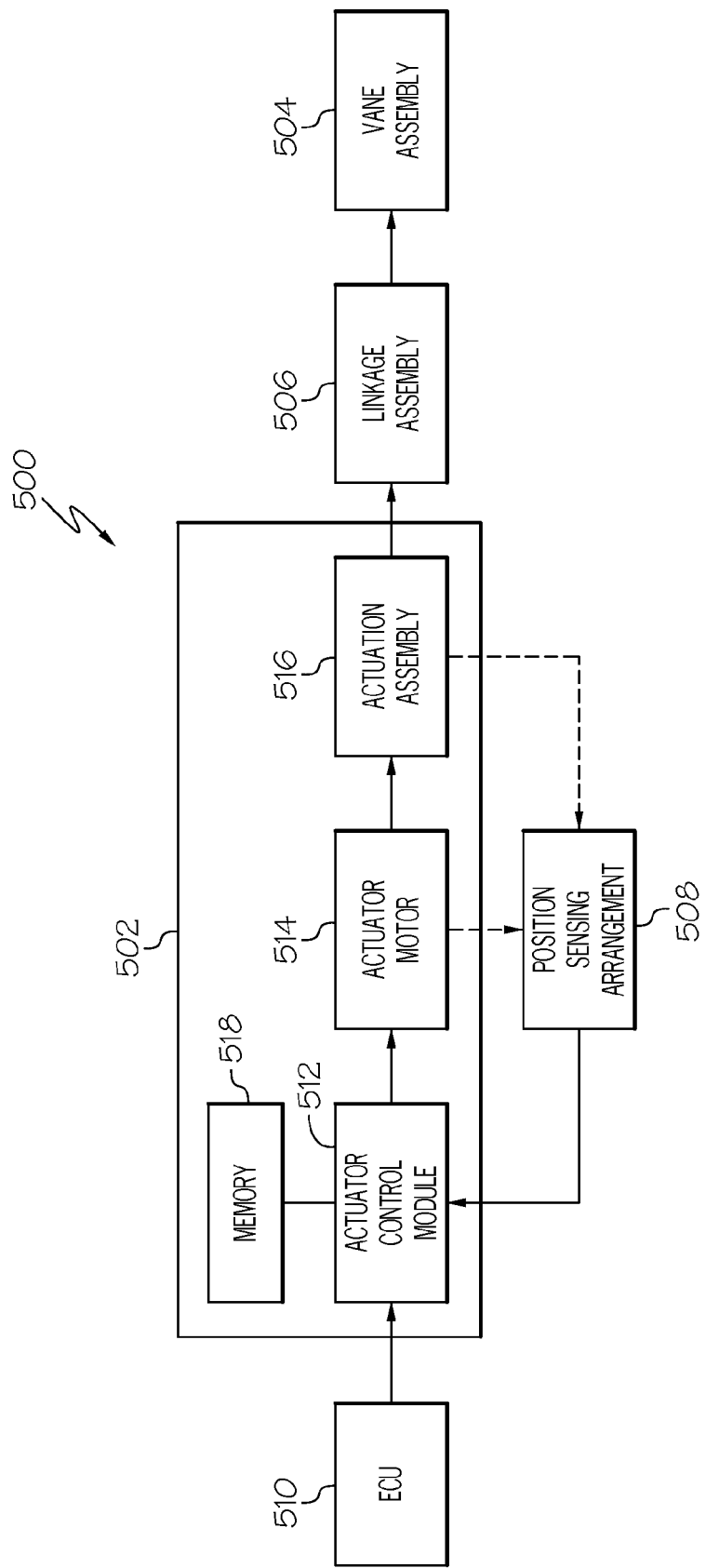
FIG. 5 is a block diagram of a turbine control system suitable for use with the engine system of FIG. 1 in accordance with one or more exemplary embodiments.
Figure 6:
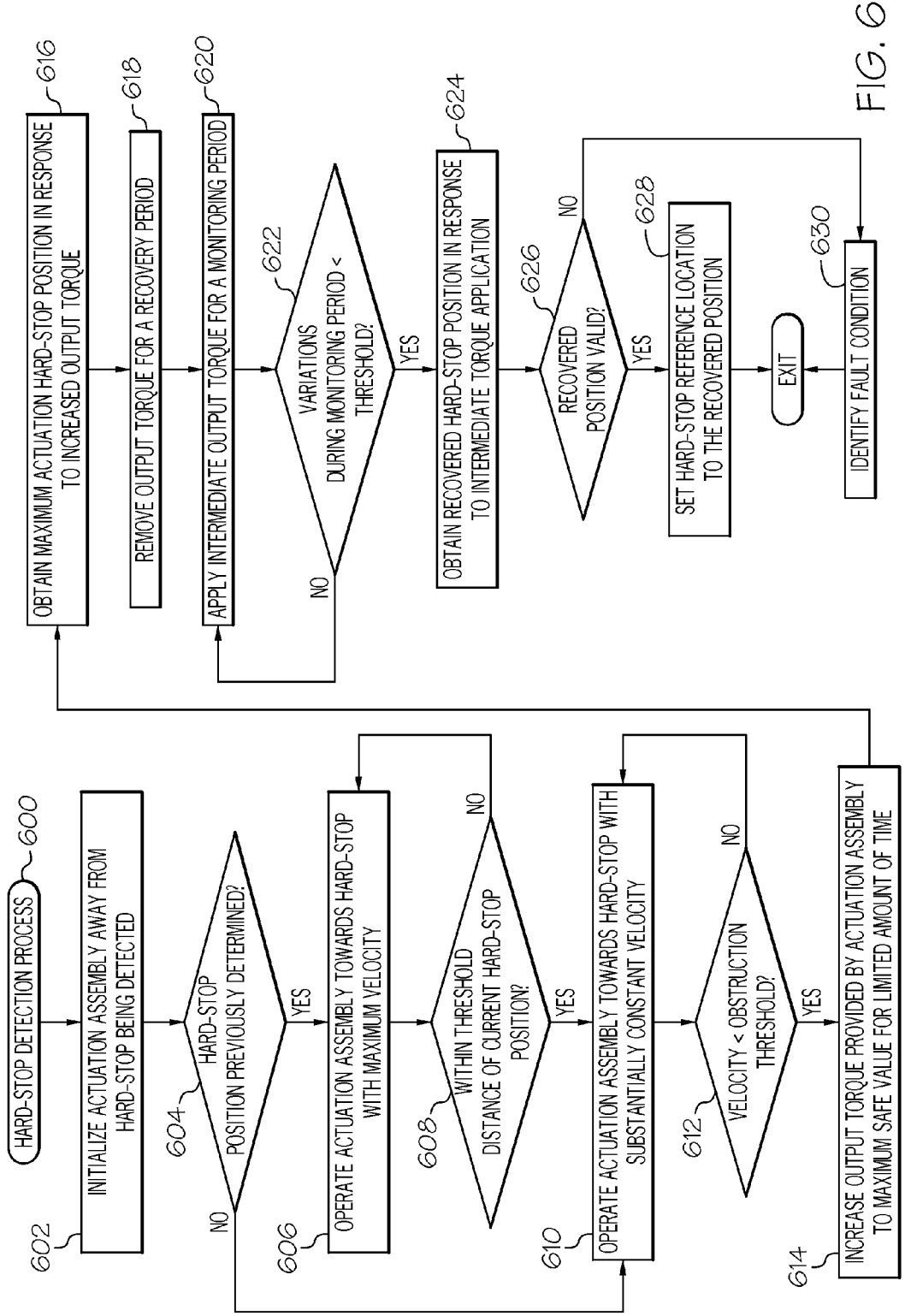
FIG. 6 is a flow diagram of an exemplary hard-stop detection process suitable for implementation by the turbine control system of FIG. 5 in accordance with one or more exemplary embodiments.
Figure 7:
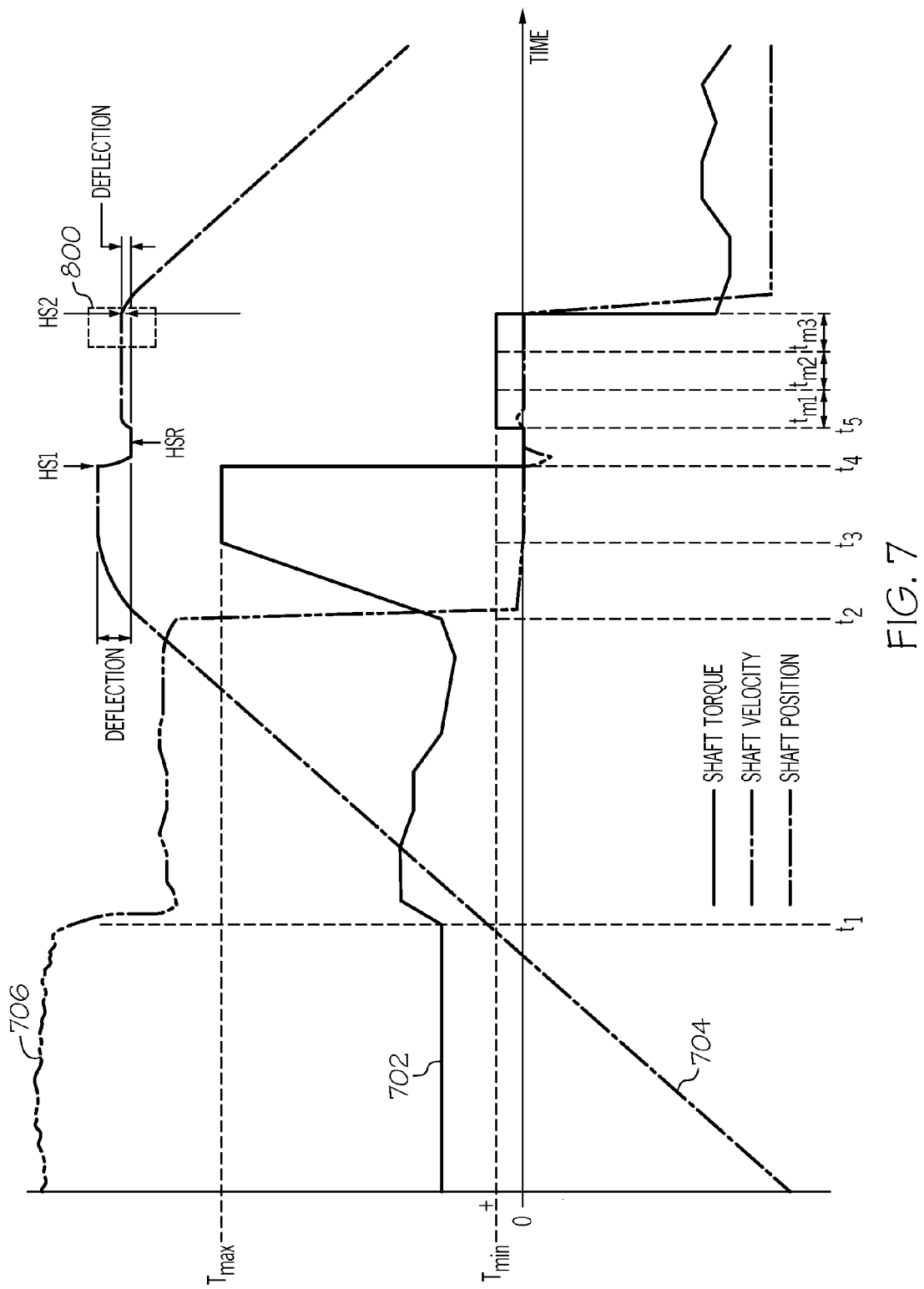
FIG. 7 is a graph depicting the rotor shaft output torque, rotor shaft position, and rotor shaft velocity for the actuator motor of the actuation arrangement in the turbine control system of FIG. 5 in accordance with an exemplary embodiment of the hard-stop detection process of FIG. 6.

Turning now to FIGS. 5-7, to compensate for any offset or drift in the relationship between the actuation position and the vane position, new or updated hard-stop reference positions for the vanes may be determined to establish a new or updated transfer function that better describes the vane position(s) with respect to the actuation position (and thereby, the relationship between the flow rate and the actuation position) over time. For example, the hard-stop detection process 600 may be performed at each key-on occurrence of the engine or whenever it is determined that the offset between the desired vane position and the actual vane position is greater than a threshold amount.

FIG. 5 depicts an exemplary variable geometry turbine control system 500 suitable for use with a turbine or turbocharger, such as turbocharger 101 in the turbocharger system 100 of FIG. 1. The variable geometry turbine control system 500 includes an actuation arrangement 502 configured to adjust the vane assembly 504 of a variable geometry turbine (or variable nozzle turbine) via a linkage assembly 506. As noted above, while the subject matter may be described herein in the context of a vane assembly 504 having a plurality of vanes (e.g., vanes 234) configured to control the angle at which the exhaust gas impacts the turbine blades, it should be appreciated that the subject matter is not limited to use with a vane assembly and may be implemented in an equivalent manner for a wastegate or any other adjustable member(s) capable of regulating, varying, or otherwise influencing the input fluid flow to a turbine. Furthermore, it should be understood that FIG. 5 is a simplified representation of a variable geometry turbine control system 500 for purposes of explanation and is not intended to limit the subject matter described herein in any way.

The illustrated actuation arrangement 502 includes an actuator control module 512 that is coupled to an actuator motor 514 (e.g., actuator 290), and the actuator control module 512 is configured to provide commands, instructions, and/or signals to the actuator motor 514 to control the position of the vane assembly 504 and perform additional processes, tasks and/or functions to support operation of the variable geometry turbine control system 500, as described in greater detail below. The actuation assembly 516 generally represents the mechanical components of the actuation arrangement 502 that are coupled to a rotor (or rotor shaft) of the actuator motor 514 and configured to translate rotation of the rotor into a corresponding displacement of the linkage assembly 506. In this regard, the actuation assembly 516 may include one or more gears, rods (e.g., rod 291), and the like configured to translate a rotational displacement of the rotor of the actuator motor 514 to a corresponding linear displacement (e.g., the displacement of the rod 291), which, in turn, is transferred to the vane assembly 504 via the linkage assembly 506. The linkage assembly 506 generally represents the components of the turbine (e.g., the unison ring 248, the linkage members 254, 260, the pin 250, and the like) that translate the displacement of the actuation assembly 516 into a corresponding adjustment of the position or orientation of the vanes 234 of the vane assembly 504.

In exemplary embodiments, the variable geometry turbine control system 500 includes a position sensing arrangement 508 (e.g., sensor 292) that detects, measures, senses, or otherwise quantifies a position associated with the actuation arrangement 502 that corresponds to the position of the vanes of the vane assembly 504. For example, in one or more embodiments, the position sensing arrangement 508 is realized as a motor position sensor, such as a rotary encoder, a resolver, or the like, which provides an output indicative of a position of a rotor of the actuator motor 514 relative to the stator. In other embodiments, the position sensing arrangement 508 may be realized as a Hall effect sensor or another suitable sensor configured to sense or otherwise quantify the position of one or more components of the actuation assembly 516 (e.g., a linear position of the actuator rod 291). The actuator control module 512 is coupled to the position sensing arrangement 508 to receive or otherwise obtain measured actuation positions, determine the relationship between the actuation position and the position of the vanes of the vane assembly 504, and operate the actuator motor 514 to adjust the position of the vanes of the vane assembly 504 to achieve a desired exhaust flow. In this regard, the actuator control module 512 may be coupled to an engine control unit 510 (e.g., ECU 151) to receive commands or instructions indicative of a desired exhaust flow, convert the commanded fluid flow into a corresponding commanded vane position, convert the commanded vane position into a corresponding commanded actuator position using the relationship between the actuation position and the vane position, and operate the actuator motor 514 to adjust the vane assembly 504 accordingly.

Depending on the embodiment, the actuator control module 512 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The steps of a method or algorithm described in connection with the embodiments described herein may be embodied directly in hardware, in firmware, in a software module executed by the actuator control module 512, or in any practical combination thereof In accordance with one or more embodiments, the actuator control module 512 includes or otherwise accesses a data storage element 518, such as a memory, one or more registers, or another suitable non-transitory short or long term computer-readable storage media, which is capable of storing computer-executable programming instructions or other data for execution that, when read and executed by the actuator control module 512, cause the actuator control module 512 to execute and perform one or more of the processes tasks, operations, and/or functions described herein. It should be noted that although FIG. 5 depicts the actuator control module 512 as being separate from the ECU 510 and implemented as part of the actuation arrangement 502, it should be noted that in other embodiments, features and/or functionality of the actuator control module 512 can be implemented by or otherwise integrated with the features and/or functionality provided by the ECU 510. In other words, the actuator control module 512 may be implemented as a component or subsystem of the ECU 510.

Referring now to FIG. 6, in an exemplary embodiment, the control system 500 is configured to perform a hard-stop detection process 600 and additional tasks, functions, and operations described below. The various tasks performed in connection with the illustrated process 600 may be implemented using hardware, firmware, software executed by processing circuitry, or any combination thereof For illustrative purposes, the following description may refer to elements mentioned above in connection with FIGS. 1-5. In practice, portions of the hard-stop detection process 600 may be performed by different elements of a turbocharger system 100, such as, the ECU 151, 510, the actuation arrangement 502, the actuator 290, 514, the actuation assembly 291, 516, the linkage assembly 506, the vane assembly 504, the position sensing arrangement 508, the actuator control module 512, and/or the memory 518. It should be appreciated that practical embodiments of the hard-stop detection process 600 may include any number of additional or alternative tasks, the tasks need not be performed in the illustrated order and/or the tasks may be performed concurrently, and/or the hard-stop detection process 600 may be incorporated into a more comprehensive procedure or process having additional functionality not described in detail herein. Moreover, one or more of the tasks shown and described in the context of FIG. 6 could be omitted from a practical embodiment of the hard-stop detection process 600 as long as the intended overall functionality remains intact.

Referring to FIG. 6 and with continued reference to FIGS. 1-5, in one or more exemplary embodiments, the hard-stop detection process 600 is initiated by the ECU 151, 510 commanding, instructing, or otherwise signaling the actuator control module 512 to determine hard-stop reference positions at a key-on occurrence of the engine 125. The hard-stop detection process 600 may also be initiated (e.g., by the ECU 151, 510 or the actuator control module 512) in response to determining there is an offset between the desired vane position and the actual vane position that is greater than a threshold amount corresponding to a maximum tolerable deviation in vane position. In yet other embodiments, the hard-stop detection process 600 may be periodically performed during operation after a threshold amount of time has elapsed since the hard-stop detection process 600 was most recently performed. For example, the ECU 151, 510 or the actuator control module 512 may automatically initiate the hard-stop detection process 600 when the engine 125 or the turbocharger 101 has been continuously operated for a threshold number of hours (e.g., 4 hours) since the preceding iteration of the hard-stop detection process 600. It should be appreciated that during the hard-stop detection process 600, the turbocharger 101 may not be operated at efficient levels.

In exemplary embodiments, the hard-stop detection process 600 initializes the actuation arrangement (and thereby, the vane assembly) away from the hard-stop position to be determined (task 602). In this regard, when the hard-stop detection process 600 is being performed to determine a hard-stop closed position, the actuator control module 512 operates the actuator motor 514 to move or displace the actuation assembly 516 in a direction corresponding to the open or maximum flow position of the vane assembly 504, and thereby, initializes the vane assembly 504 away from the end of its range of displacement that corresponds to the closed or minimum flow position. For example, if displacing the actuation assembly 516 in a positive reference direction actuates the vane assembly 504 towards the closed position, the actuator control module 512 operates the actuator motor 514 to displace the actuation assembly 516 in the negative reference direction towards the opposing end of its range of displacement, thereby actuating the vane assembly 504 towards the open position and away from the closed position.

The hard-stop detection process 600 continues by identifying or otherwise determining whether a value for the hard-stop position has been previously determined (task 604), and if so, operating the actuation assembly towards the hard-stop position being determined with maximum velocity until the actuation assembly is within a threshold distance of the previous hard-stop position (tasks 606, 608). For example, if a current reference value for the hard-stop closed position is stored or otherwise maintained in memory 518, the actuator control module 512 commands or otherwise operates the actuator motor 514 to displace the actuation assembly 516 from the initialized open position towards the current hard-stop closed position with a maximum velocity until the actuation assembly 516 is sufficiently close to the current hard-stop closed position. The threshold distance may be chosen as a number of rotational increments for the actuator motor 514 (or displacement increments of the actuation assembly 516) offset from the current hard-stop position. For example, in some embodiments, the position sensing arrangement 508 is realized as a rotary encoder that detects incremental rotations of the rotor of the actuator motor 514, with the current hard-stop position corresponding to a particular encoder value. The actuator control module 512 commands or otherwise operates the actuator motor 514 to rotate in the direction corresponding to displacement of the actuation assembly 516 towards the hard-stop position with the maximum achievable rotational velocity until the encoder value output by the position sensing arrangement 508 is equal to the current hard-stop encoder value less an offset corresponding to the threshold distance. Depending on the embodiment, the offset may be determined as a percentage of the total range of displacement for the actuation assembly, a percentage of the current hard-stop reference value, or a fixed amount.

Once the actuation assembly is within a threshold distance of the previous hard-stop position, or if a value for the hard-stop position has not been previously determined, the hard-stop detection process 600 continues by operating the actuation assembly in the direction towards the hard-stop position to be determined with a substantially constant velocity (task 610). In this regard, the actuator control module 512 may monitor the measured actuation position from the position sensing arrangement 508, determine a corresponding actuation velocity based on the rate of change in the position, and implement closed-loop control to maintain the actuation velocity substantially constant while varying the output torque provided by the motor 514. In exemplary embodiments, the constant velocity corresponds to a maximum safe velocity that is unlikely to damage the vane assembly 504, the linkage assembly 506, or the actuation assembly 516 if a physical hard-stop or other obstruction is encountered at that velocity. The hard-stop detection process 600 monitors the velocity as the actuation assembly advances towards the hard-stop position and detects or otherwise identifies when the actuation velocity falls below an obstruction threshold that indicates further advancement of the actuation assembly in the current direction of actuation is being impeded (task 612). In this regard, the obstruction threshold corresponds to a velocity that is indicative of either the vane assembly 504 or the actuation assembly 516 encountering a physical impediment indicative of a potential hard-stop.

Still referring to FIG. 6, in response to encountering a physical impediment, the hard-stop detection process 600 continues by increasing the output torque applied to displace the vane assembly for a limited duration of time (task 614). In exemplary embodiments, the actuator control module 512 commands or otherwise operates the actuator motor 514 to provide an increased torque that is applied to the actuation assembly 516 in the actuation direction towards the hard-stop. The increased torque is greater than or equal to the maximum torque limit imposed when performing closed-loop control of the actuation velocity, and the combination of the magnitude of the increased torque and the duration of its application is chosen to increase the likelihood that the reduction in the actuation velocity below the obstruction threshold is attributable to a physical hard-stop, rather than noise, friction, or some other temporary obstruction. That said, in exemplary embodiments, the increased torque is less than or equal to a maximum safe torque value that is unlikely to damage the vane assembly 504, the linkage assembly 506, or the actuation assembly 516 when applied over the limited duration if a physical hard-stop has been encountered. The duration of time that the increased torque is applied may be chosen to be greater than or equal to a minimum amount of time required for the applied torque to stabilize.

In some embodiments, the increased torque applied by the actuator control module 512 is dynamically determined based at least in part on the temperature or some other environmental factor. For example, the ECU 510 or the actuator control module 512 may be coupled to a temperature sensing arrangement that provides a measured temperature associated with the turbocharger 101, with the actuator control module 512 receiving the measured temperature and calculating the increased torque value based at least in part on the measured temperature. In this regard, the increased torque value may increase as the temperature of the turbocharger 101 decreases, or conversely, decrease as the temperature of the turbocharger 101 increases. For example, the product of the torque-to-displacement ratio and the hard-stop displacement tolerance may be multiplied by a temperature compensation factor that adjusts the resulting torque value based on the current temperature.

After applying the increased torque, the hard-stop detection process 600 receives or otherwise obtains a first hard-stop reference position corresponding to the extent of the actuation or displacement of the vane assembly in the actuation direction while that increased torque is applied (task 616). For example, at or near the end of the limited duration while the motor 514 is still applying the increased initial reference torque, the actuator control module 512 obtains, from the position sensing arrangement 508, a measured position value that corresponds to the physical limit of the actuation in the direction. In other words, the measured position value reflects the position of the motor 514 or the actuation assembly 516 when the vanes 234 of the vane assembly 504 have reached their maximum point of deflection and any slack or tolerance in the kinematics chain between the vane assembly 504 and the motor 514 has been maximally compressed. The actuator control module 512 sets a first hard-stop reference position corresponding to the maximum actuation limit to the measured position value obtained from the position sensing arrangement 508 before decreasing the torque applied by the motor 514. For example, the actuator control module 512 may store the measured actuation position value at the end of applying the initial reference torque value in memory 518 at a location in memory 518 that corresponds to a maximum hard-stop position.

After obtaining the first hard-stop reference position corresponding to the maximum actuation limit in the direction being analyzed, the hard-stop detection process 600 decreases or otherwise removes the torque being applied in the actuation direction for a recovery period (task 618). In this regard, the actuator control module 512 commands or otherwise operates the motor 514 to cease applying the initial reference torque and apply a reduced torque that does not advance the actuation assembly 516 in the current actuation direction, thereby allowing the vanes 234 of the vane assembly 504 to revert to an undeflected or recovered state. For example, the actuator control module 512 may command or otherwise operate the motor 514 to provide closed-loop position control to maintain the actuation position substantially stationary, so that the vane assembly 504 is maintained at or near the hard-stop position under aerodynamic loading. In this regard, under low aerodynamic loading, the actuator control module 512 may operate the motor 514 to provide an output torque equal to zero. In practice, to minimize the duration of the hard-stop detection process 600, the recovery period may be chosen to be the minimum amount of time required to for the actuation position to stabilize under unloaded conditions after the increased initial reference torque is removed.

After the recovery period, the hard-stop detection process 600 adjusts the output torque applied to displace the vane assembly in the actuation direction to a subsequent reference torque value for a monitoring period of time and monitors variations in the actuation position during the monitoring period (tasks 620, 622). The subsequent reference torque value that is applied by the motor 514 may be greater than the torque applied during the recovery period but less than the initial reference torque value applied to reach the maximum actuation limit. In one or more embodiments, the subsequent reference torque value is greater than or equal to the minimum amount of torque required to exceed friction or other inertial forces associated with the kinematics chain. While the subsequent reference torque value is applied, the actuator control module 512 monitors the measured actuation position from the position sensing arrangement 508 and calculates or otherwise determines the variation in the measured actuation position during the monitoring period. In this regard, torque ripple, electrical noise, aerodynamic loading, and other factors may cause oscillations or other variations in the actuation position output by the position sensing arrangement 508. In exemplary embodiments, the actuator control module 512 determines the variation in the measured actuation position as the difference between the maximum and minimum measured actuation positions during the monitoring period.

When the variations in the actuation position during the monitoring period are less than a stability threshold, the hard-stop detection process 600 receives or otherwise obtains a second hard-stop reference position corresponding to the extent of the actuation or displacement of the vane assembly in the actuation direction while the intermediate torque is applied (task 624). In this regard, the stability threshold generally represents an amount of variation in the actuation position that is representative of the vane assembly 504 or the actuation assembly 516 being substantially stable. In one or more embodiments, the stability threshold is less than or equal to the displacement tolerance for the hard-stop reference position. For example, if the displacement tolerance is 0.2° of rotation, the stability threshold may be chosen to be the amount of variation in the actuation position that is representative of 0.2° of rotation the vane assembly 504 based on the current transfer function for relating the actuation position to the vane orientation. In exemplary embodiments, when the variation in the actuation position is greater than the threshold amount, the hard-stop detection process 600 may repeat applying the second reference torque value for one or more additional monitoring periods until the variations in the actuation position are less than the threshold (tasks 620, 622) or until the hard-stop detection process 600 times out. The second hard-stop reference position represents the hard-stop position of the vane assembly 504 after recovering from the outermost point of deflection of the vanes 234 and/or compression in the kinematics chain when the initial reference torque value was applied. In exemplary embodiments, the actuator control module 512 identifies the maximum measured actuation position during the monitoring period and stores that maximum measured actuation position value in the memory 518 at a location that corresponds to the recovered hard-stop position.

Still referring to FIG. 6, in exemplary embodiments, the hard-stop detection process 600 identifies or otherwise determines whether the recovered hard-stop position is valid based at least in part on the maximum hard-stop position, and when the recovered hard-stop position is valid, the hard-stop detection process 600 sets the hard-stop reference position that is subsequently used to control the turbine to the recovered hard-stop position (tasks 626, 628). In exemplary embodiments, the actuator control module 512 compares the recovered hard-stop position to the maximum hard-stop position and sets the hard-stop reference position to the recovered hard-stop position when the difference between the maximum hard-stop position and the recovered hard-stop position is less than a fault threshold. The fault threshold amount represents the expected maximum deflection, compression, or slack between the actuator motor 514 and the vane assembly 504 in a healthy system. In this regard, when the difference between the maximum hard-stop position and the recovered hard-stop position is greater than the threshold amount and the recovered hard-stop position is not valid, the hard-stop detection process 600 identifies or otherwise determines a fault condition exists (task 630).

Additionally, in some embodiments, the hard-stop detection process 600 may also identify or otherwise determine a fault condition exists when the difference between the maximum hard-stop position and the recovered hard-stop position is less than a lower threshold amount. The lower threshold amount may be chosen to ensure that excessive friction does not prevent the vane assembly 504 and/or the actuation assembly 516 from retracting from the maximum hard-stop position to a recovered hard-stop position. In other words, the hard-stop detection process 600 identifies a fault condition when the difference between the maximum hard-stop position and the recovered hard-stop position is not within a healthy range defined by the lower friction threshold amount and the upper fault threshold amount. In response to identifying a fault condition, the actuator control module 512 may implement a modified control scheme for controlling the vane assembly 504 during normal operation of the turbocharger 101 or otherwise take remedial action to mitigate the fault condition. For example, in some embodiments, the actuator control module 512 may notify the ECU 510, which, in turn, may generate or otherwise provide an indication (e.g., by activating a check engine light) that one of the vane assembly 504, the linkage assembly 506, or the actuation arrangement 502 associated with the turbocharger 101 requires maintenance.

When the difference between the maximum hard-stop position and the recovered hard-stop position is less than the fault threshold or within a healthy range of values, the actuator control module 512 sets or otherwise updates the validated hard-stop reference position used to control the vane assembly 504 to the value of the measured recovered hard-stop position. In this regard, the recovered hard-stop position value is utilized to determine an updated transfer function that defines the relationship between the measured actuation position from the position sensing arrangement 508 and the corresponding orientation (or position) of the vanes 234 of the vane assembly 504. For example, when the hard-stop detection process 600 is performed to determine the hard-stop closed reference position, the recovered hard-stop closed position value obtained from the position sensing arrangement 508 may be utilized to determine a corresponding a minimum-flow actuation position for the vane assembly 504. Thereafter, the actuator control module 512 may operate the motor 514 to actuate the vane assembly 504 to achieve a desired flow rate for the turbine based at least in part on the minimum-flow position. Thus, the actuator control module 512 operates the motor 514 to actuate the vane assembly 504 to achieve a commanded flow received from the ECU 510 in a manner that is influenced by the hard-stop reference position determined by the hard-stop detection process 600.

FIG. 7 depicts a graphical representation of the rotor shaft output torque 702, rotor shaft position 704, and rotor shaft velocity 706 for the actuator motor 514 of the actuation arrangement 502 in accordance with an exemplary embodiment of the hard-stop detection process 600 of FIG. 6. For purposes of explanation, the subject matter will now be described in the context of performing the hard-stop detection process 600 to determine the reference hard-stop closed position, however, it should be appreciated that the subject matter may be implemented in an equivalent manner to determine the reference hard-stop closed position.

To determine the reference hard-stop closed position, the actuator control module 512 operates the motor 514 to displace the actuation assembly 516 in a direction towards the open position for the vane assembly 504 to initialize the vanes 234 of the vane assembly 504 away from the closed position. After initializing the vane assembly 504 away from the closed position, the actuator control module 512 operates the motor 514 with the maximum achievable rotor shaft velocity in the actuation direction away from the open position to close the vane assembly 504 as quickly as possible (task 606). At time $t_1$, when the measured rotor shaft position from the sensing arrangement 508 is within a threshold number of rotational increments from the current hard-stop reference position, the actuator control module 512 transitions to operating the motor 514 with a substantially constant rotor shaft velocity to close the vane assembly 504 at the maximum safe actuation velocity (task 610). As illustrated, the rotor shaft output torque may vary as needed to maintain the constant velocity without exceeding the maximum safe output torque ($T_{max}$). At time $t_2$, when the rotor shaft velocity falls below the obstruction threshold, the actuator control module 512 operates the motor 514 to increase the rotor shaft output torque and maintain the rotor shaft output torque at the maximum safe rotor shaft output torque ($T_{max}$) for a duration of time (e.g., $t_4$-$t_3$) before obtaining the measured rotor shaft position (HS1) corresponding to the maximum deflection point for the vanes 234 of the vane assembly 504 (and/or the maximum compression point for the kinematics chain between the motor 514 and the vane assembly 504) at the end of the application of the maximum safe rotor shaft output torque at time $t_4$.

After obtaining the maximum hard-stop position (HS1) at time $t_4$, the actuator control module 512 operates the motor 514 to decrease the rotor shaft output torque to zero for a recovery period (e.g., $t_5$-$t_4$), thereby allowing the rotor shaft position to revert to a recovered state (HSR), before operating the motor 514 to increase the rotor shaft output torque to an intermediate value ($T_{min}$) at time $t_5$. Thereafter, the actuator control module 512 operates the motor 514 to maintain the rotor shaft output torque at the intermediate value for a first monitoring period ($t_{m1}$) and monitors variations in the measured rotor shaft position output by the sensing arrangement 508. When the variations in the rotor shaft position exceed a stability threshold, the actuator control module 512 operates the motor 514 to maintain the rotor shaft output torque at the intermediate value for one or more subsequent monitoring periods ($t_{m2}$, $t_{m3}$) and continues monitoring the measured rotor shaft position output. In the illustrated embodiment, the variations in the measured rotor shaft position during the third monitoring period ($t_{m3}$) are less than the stability threshold, and in response, the actuator control module 512 identifies or otherwise obtains a maximum measured rotor shaft position in the actuation direction during the third monitoring period ($t_{m3}$) and sets the recovered hard-stop closed position in memory 518 to be equal to that maximum measured rotor shaft position. In one embodiment, the actuator control module 512 sets the recovered hard-stop closed position to the maximum measured rotor shaft position in the closed direction during the third monitoring period ($t_{m3}$). In other embodiments, the actuator control module 512 may set the recovered hard-stop closed position to the most recent peak measured rotor shaft position in the closed direction at or near the third monitoring period ($t_{m3}$), or the actuator control module 512 may average the peak measured rotor shaft positions in the closed direction during the third monitoring period ($t_{m3}$) and set the recovered hard-stop closed position to that average peak measured rotor shaft position.

FIG. 8 depicts an exemplary graphical representation of the variations in the rotor shaft position during a monitoring period 800 while an intermediate torque value is applied in a closed direction. As illustrated, due to torque ripple, aerodynamic loading, electrical noise, deflection of the vanes 234 of the vane assembly 504, the spring constant of the linkage assembly 506, and/or other factors, the measured rotor shaft position 704 may oscillate between peak closed positions and trough closed positions during a monitoring period. When a difference between the maximum actuation position and minimum actuation position during the monitoring period is less than a stability threshold, the actuator control module 512 may set the recovered hard-stop closed position to the maximum measured closed position during the monitoring period. Thereafter, the actuator control module 512 verifies or otherwise confirms the difference between the maximum hard-stop closed position (HS1) and the recovered hard-stop closed position (HS2) is less than a fault threshold before updating the hard-stop closed reference position to the recovered hard-stop closed position identified during the monitoring period.

Referring again to FIGS. 5-7, the subject matter described herein allows for hard-stop reference positions to be determined in a manner that does not damage the vane assembly 504, linkage assembly 506, or actuation assembly 516 by limiting the actuation velocity or actuation torque to safe values at or near the hard-stop. By limiting the potentially deleterious effects of hard-stop impact, a hard-stop reference position may be determined more accurately and reliably by actuating to the hard-stop and accounting for deflection, slack or compression, torque ripple, aerodynamic loading, electrical noise, and the like. As a result, hard-stop reference positions may be repeatedly determined with a relatively high level of accuracy (e.g., within +/−1 encoder count), and in some embodiments, the determined hard-stop reference positions may be utilized to control subsequent operations of the turbine in lieu of soft-stop positions, thereby providing a more precise control of the input fluid flow to the turbine across a wider range of vane positions. Additionally, compensation for temperature, voltage, or other environmental factors may be employed to ensure accuracy and reliability across a range of conditions.

For the sake of brevity, conventional techniques related to variable nozzle or variable geometry turbines, turbocharger systems, mechanical actuation, position sensing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of determining a hard-stop reference position associated with a variable geometry member regulating fluid flow, the method comprising:
   actuating the variable geometry member in a first direction with a first reference torque;
   obtaining a first position associated with the variable geometry member in response to the first reference torque;
   after actuating the variable geometry member with the first reference torque, actuating the variable geometry member in the first direction with a second reference torque, the second reference torque being less than the first reference torque;
   obtaining a second position associated with the variable geometry member in response to the second reference torque; and
   identifying the second position as the hard-stop reference position when a difference between the first position and the second position is less than a fault threshold.

2. The method of claim 1, further comprising monitoring variations in a position associated with the variable geometry member while actuating the variable geometry member with the second reference torque over a monitoring period, wherein obtaining the second position comprises obtaining a maximum measured value for the position associated with the variable geometry member during the monitoring period when the variations are less than a stability threshold.

3. The method of claim 1, further comprising waiting for a recovery period after actuating the variable geometry member with the first reference torque prior to actuating the variable geometry member in the first direction with the second reference torque.

4. The method of claim 1, further comprising actuating the variable geometry member in the first direction with a constant velocity prior to actuating the variable geometry member in the first direction with the first reference torque.

5. The method of claim 4, wherein actuating the variable geometry member in the first direction with the first reference torque comprises actuating the variable geometry member in the first direction with the first reference torque when a velocity associated with the variable geometry member is less than an obstruction threshold.

6. The method of claim 4, further comprising actuating the variable geometry member in the first direction with a maximum velocity prior to actuating the variable geometry member in the first direction with the constant velocity, wherein actuating the variable geometry member in the first direction with the constant velocity comprises actuating the variable geometry member in the first direction with the constant velocity when a difference between a current position associated with the variable geometry member and a previous hard-stop reference position is less than a threshold distance.

7. The method of claim 4, further comprising initializing the variable geometry member in a direction opposite the first direction prior to actuating the variable geometry member in the first direction with the constant velocity.

8. The method of claim 1, the variable geometry member being coupled to actuation assembly, wherein:
actuating the variable geometry member in the first direction with the first reference torque comprises a control module operating a motor coupled to the actuation assembly to provide the first reference torque to displace the actuation assembly in an actuation direction corresponding to the first direction; and
actuating the variable geometry member in the first direction with the second reference torque comprises the control module operating the motor to provide the second reference torque to displace the actuation assembly in the actuation direction.

9. The method of claim 8, wherein obtaining the first position comprises the control module obtaining a first measured position from a position sensing arrangement coupled to the motor;
obtaining the second position comprises the control module obtaining a second measured position from the position sensing arrangement; and
the control module identifies the second measured position as the hard-stop reference position when the difference between the first measured position and the second measured position is less than the fault threshold.

10. A computer-readable medium having computer-executable instructions stored thereon that, when executed by a processing system of an actuation arrangement associated with the variable geometry member, cause the processing system to perform the method of claim 1.

11. A system comprising:
a turbine including a variable geometry member;
an actuation arrangement comprising:
a motor; and
an actuation assembly coupled between the motor and the variable geometry member;
a position sensing arrangement coupled to the actuation arrangement to measure an actuation position associated with the actuation arrangement; and
a control module coupled to the motor and the position sensing arrangement to:
operate the motor to actuate the variable geometry member in a first direction with a first reference torque;
obtain a first actuation position from the position sensing arrangement in response to the first reference torque;
operate the motor to actuate the variable geometry member in the first direction with a second reference torque that is less than the first reference torque after operating the motor with the first reference torque;
obtain a second actuation position from the position sensing arrangement in response to the second reference torque; and
identify the second actuation position as a hard-stop reference position when a difference between the first actuation position and the second actuation position is less than a fault threshold.

12. The system of claim 11, wherein the variable geometry member comprises a vane configured to regulate fluid flow to the turbine.

13. The system of claim 11, wherein the variable geometry member comprises a wastegate.

14. The system of claim 11, wherein the first reference torque comprises a maximum safe torque for the variable geometry member.

15. The system of claim 11, wherein:
the position sensing arrangement is coupled to the motor to measure a shaft position associated with a rotor of the motor;
the rotor is coupled to the actuation assembly to displace the actuation assembly in response to rotation of the rotor;
the first actuation position comprises a first measured shaft position; and
the second actuation position comprises a second measured shaft position.

16. The system of claim 11, further comprising an engine control unit coupled to the control module to provide commanded flow for the turbine, wherein the control module operates the motor to actuate the variable geometry member based on the commanded flow in a manner that is influenced by the hard-stop reference position.

17. A method of determining a hard-stop reference position associated with a vane assembly of a turbine, the vane assembly comprising a plurality of vanes configured to regulate fluid flow to the turbine, the method comprising:
initializing the vane assembly away from the hard-stop reference position;
after initializing the vane assembly away from the hard-stop reference position, actuating the vane assembly in an actuation direction towards the hard-stop reference position with a first reference torque;
obtaining a first actuation position associated with the vane assembly while the first reference torque is applied;

after obtaining the first actuation position, removing the first reference torque for a recovery period;

after the recovery period, actuating the vane assembly in the actuation direction with a second reference torque, the second reference torque being less than the first reference torque;

obtaining a second actuation position associated with the vane assembly while the second reference torque is applied; and when a difference between the first actuation position and the second actuation position is less than a fault threshold, utilizing the second actuation position as the hard-stop reference position.

18. The method of claim 17, further comprising monitoring variations in a position associated with the vane assembly while the second reference torque is applied over a monitoring period, wherein obtaining the second actuation position comprises obtaining a maximum actuation position associated with the vane assembly during the monitoring period when the variations are less than a stability threshold.

19. The method of claim 17, further comprising actuating the vane assembly in the actuation direction with a constant velocity after initializing the vane assembly away from the hard-stop reference position and prior to actuating the vane assembly with the first reference torque.

20. The method of claim 17, the hard-stop reference position corresponding to the plurality of vanes in a closed position, wherein utilizing the second actuation position as the hard-stop reference position comprises:

determining a minimum-flow position for the vane assembly based at least in part on the second actuation position; and actuating the vane assembly to achieve a desired flow rate for the turbine based at least in part on the minimum-flow position.

* * * * *